United States Patent
Bellora et al.

(10) Patent No.: US 7,953,068 B2
(45) Date of Patent: May 31, 2011

(54) EXCHANGE PROTOCOL FOR COMBINATIONAL MULTIMEDIA SERVICES

(75) Inventors: Mauro Bellora, Gallarate (IT); Gianluca Di Pasquale, Milan (IT); Chiara Dotti, Milan (IT); Nancy Greene, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 875 days.

(21) Appl. No.: 10/572,499

(22) PCT Filed: Sep. 17, 2004

(86) PCT No.: PCT/EP2004/052236
§ 371 (c)(1),
(2), (4) Date: Nov. 6, 2007

(87) PCT Pub. No.: WO2005/029809
PCT Pub. Date: Mar. 31, 2005

(65) Prior Publication Data
US 2008/0043717 A1 Feb. 21, 2008

(30) Foreign Application Priority Data
Sep. 19, 2003 (GB) .................................. 0321975.5

(51) Int. Cl.
*H04L 12/66* (2006.01)
(52) U.S. Cl. ......................... 370/352; 370/354; 370/466
(58) Field of Classification Search .................. None
See application file for complete search history.

(56) References Cited

U.S. PATENT DOCUMENTS 7,167,470 B2 * 1/2007 Bailey et al. .................. 370/352
2004/0196867 A1 * 10/2004 Ejzak et al. .................. 370/468

OTHER PUBLICATIONS

B. Campbell et al: "Instant Message in SIMPLE" Simple Working Group, Jun. 30, 2003, pp. 1-57, XP015003375, abstract, pp. 4-15, pp. 19, 23, 28.
"Digital cellular telecommunications system (Phase 2+); Universal Mobile Telecommunications System (UMTS); IP Multimedia Subsystem (IMS); Stage 2 (3GPP TS 23.288 version 5.6.0 Release 5); ETSI TS 123 228" ETSI Standards, European Telecommunications Standards Institute, Sophia-Antipo, FR, vol. 3-SA2, No. V560 Sep. 2002, XP014007876 ISSN: 0000-0001 pp. 8-12.

* cited by examiner

Primary Examiner — Duc C Ho

(57) ABSTRACT

A method of transporting image or video information between end user terminals via a packet switched network whilst a circuit switched connection is established between the end users includes establishing a circuit switched connection between a plurality of end user terminals for carrying voice traffic. The method also includes using the. Message Session Relay Protocol (MSRP) to encapsulate image or video information transmitted between end user terminals via a packet switched network, where MSRP related traffic is routed between said end user terminals via one or more MSRP enabled nodes. Additionally, the method includes installing service policies into the or at least one MSRP node from a session initiation protocol (SIP) application server (AS) located in the control-plane of an IMS network and checking multimedia service requests against the installed policies to control end user terminal access to certain packet based services.

16 Claims, 6 Drawing Sheets

EXCHANGE PROTOCOL FOR COMBINATIONAL MULTIMEDIA SERVICES

FIELD OF THE INVENTION

The present invention relates to combinational multimedia services and in particular, though not necessarily, to a method for encapsulating contents exchanged between users, enforcing network policy on such contents, and generating charging reports.

BACKGROUND TO THE INVENTION

An IP Multimedia service involves the dynamic combination of voice, video, messaging, etc. within the same session. By growing the number of basic applications and the media that it is possible to combine, the number of services offered to the end user will grow exponentially and the inter-personal communication experience will be enriched. This will lead to a new generation of personalized, richer multimedia communication.

A combinational IP Multimedia service is a Multimedia service that includes and combines both a Circuit Switched media (such as voice) and a Packet Switched media over the IP Multimedia Subsystem (IMS) (such as pictures, video, presence, instant messages, etc.). Combinational IP Multimedia enables a user during a Circuit Switched (CS) voice conversation with another user to take a picture, an audio/video clip, etc. and transmit this content to the other party in the conversation. Either party in the conversation may initiate transmission of content to the other party. IMS is the technology as defined by 3 GPP to provide IP Multimedia services. FIG. 1 illustrates a family of combinational services referred to below as weShare, whilst FIG. 2 illustrates the IMS architecture in 3 GPP.

A combinational IP multimedia service requires a protocol to carry the images (or audio/video clip, video, etc) during the CS call. Images/Clips must be transferred using a transport protocol such as TCP, which takes care of retransmissions and ensures that the packets, which the images/clips are broken into, are delivered in order. There also needs to be a user-plane protocol at a higher level (above TCP) that delimits the transfer of an image/clip Message Session Relay Protocol (MSRP) is a candidate for transferring content such as images or video-lips. MSRP is being specified by IETF and is currently described in the document "draft-ieff-simple-message-sessions-08.txt". MSRP provides a mechanism to transport session-mode contents (e.g. instant messages, pictures, etc.) between endpoints. However, aspects such as weShare service-specific policy enforcement and charging reporting are not covered by the MSRP and by the 3 GPP IMS standards.

SUMMARY OF THE INVENTION

According to the present invention there is provided a method of transporting information between end user terminals via a packet switched-based IP Multimedia Subsystem network whilst a circuit switched connection is established between the end users, the method comprising:
  using the Message Session Relay Protocol, MSRP, to encapsulate information blocks transmitted between users.

Preferably, MSRP related traffic is routed between said end user terminals via one or more MSRP-enabled nodes. The or each MSRP-enabled node is preferably coupled to a SIP Application Server (SIP AS) which controls subscriber access to IP multimedia subsystem based services. The MSRP-enabled node is preferably a Media Resource Function (MRF) element.

At IMS session set-up, the incoming SIP signaling (i.e. SIP INVITE) is first processed by the SIP AS, which executes service logic (e.g. subscription authorization). As part of service logic execution, the SIP AS prepares and stores a vXML (voice over extended Markup Language) script to be later retrieved by the MRF. The vXML script contains instruction on the policy to be enforced, such as allowed content type (e.g. image/gif, image/jpeg, video-clip), content size (kbytes), and send/receive direction.

Once the SIP AS accepts the SIP INVITE (e.g. user is authorized to the invoked weShare service), the SIP AS acts as a proxy server and transmits the SIP INVITE to the MRF. Before proxying the SIP INVITE, the service logic includes into it the HTTP URI to be used to retrieve the vXML script (e.g. the HTTP URI, which embeds the VXML script identity, may be carried in the SIP Request-URI or in a SIP Route header). The MRF receives the SIP INVITE and uses the HTTP protocol to retrieve the vXML script from the SIP AS using the HTTP URI.

In particular, the MRF uses the received policy information to:
  possibly downgrade the request from a user terminal during the SIP session establishment (e.g. a request to send a 50 Kbytes jpeg image is downgraded to a maximum allowed size of 40 Kbytes); and
  check that the actual content transmitted is in accordance with the specified policy (e.g. a terminal may try sending an image larger than allowed/negotiated and such an action must be rejected).

From an HTTP perspective, the SIP AS acts as a vXML server towards the MRF. NOTE: as a complement to SIP, HTTP is just an example of a protocol which might be used over the interface between SIP AS and MRF for retrieval of instructions.

From a SIP perspective, the MRF acts as a SIP B2BUA (back to back user agent), and creates a new SIP leg/dialog towards the or each invited UE.

From the MSRP perspective, the MRF acts as a back to back end-point.

Session Initiation Protocol (SIP) [SIP RFC3261] and Session Description Protocol (SDP) Offer/Answer model are used to establish and negotiate the MSRP session. From the SIP perspective, an MSRP-based content session (e.g. an weShare Image/Clip content session) is considered as any other media session, and therefore is described by SDP.

Preferably, for the content transferred via the MRF using MSRP protocol, the MRF reports charging inputs to the charging system.

Other aspects of the invention are defined in the appended claims.

DETAILED DESCRIPTION OF THE INVENTION

Figure 1:
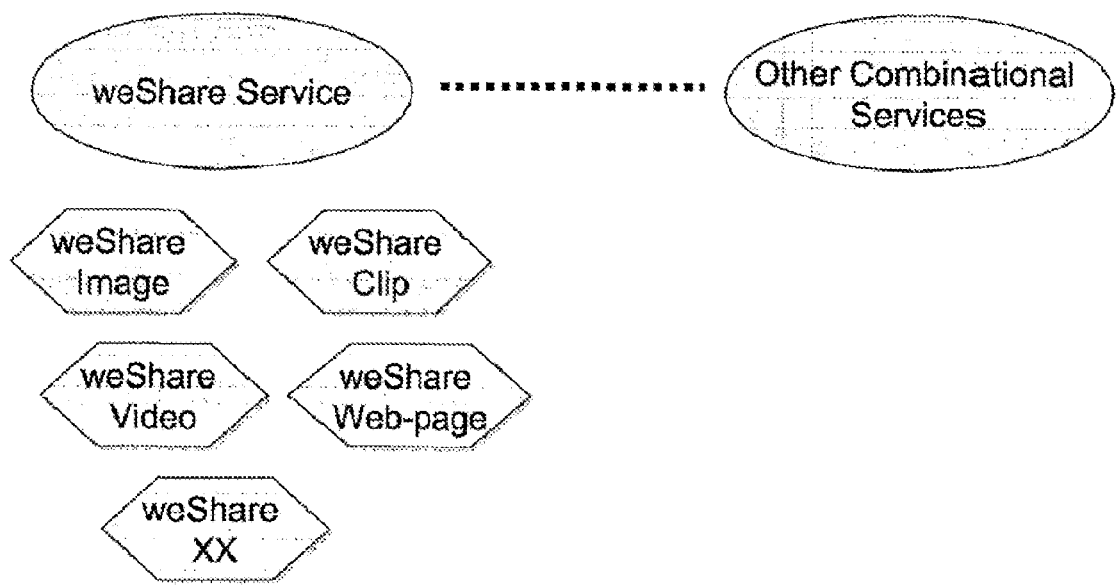
FIG. 1 illustrates schematically the services facilitated by the weShare combinational multimedia service.
Figure 2:
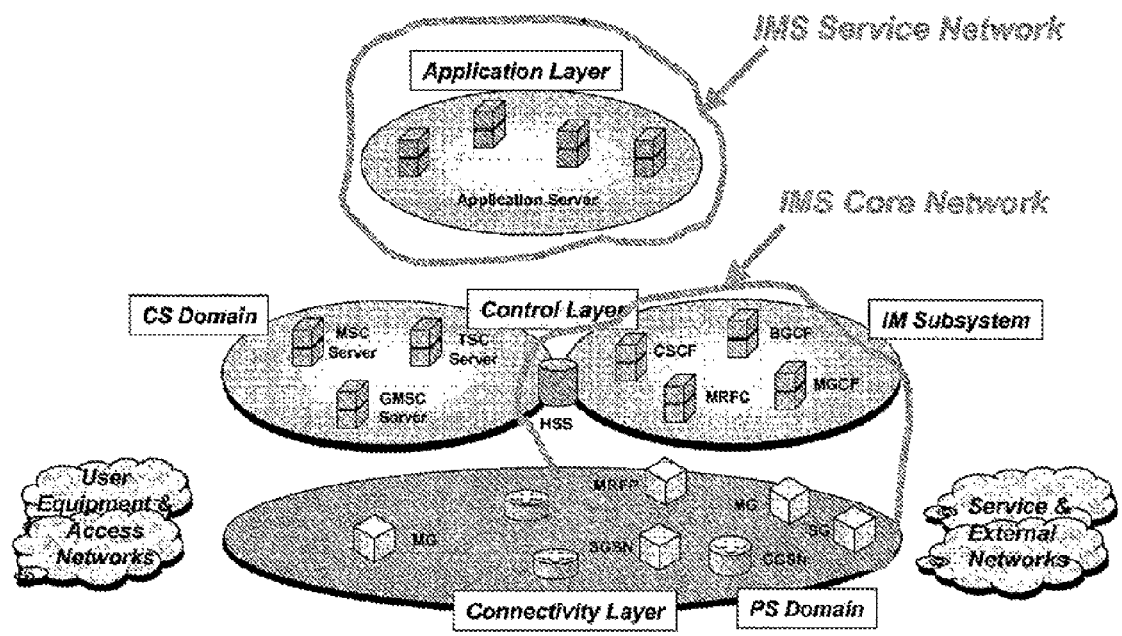
FIG. 2 illustrates schematically the integration of the IP Multimedia Service into a 3 GPP network.
Figure 3:
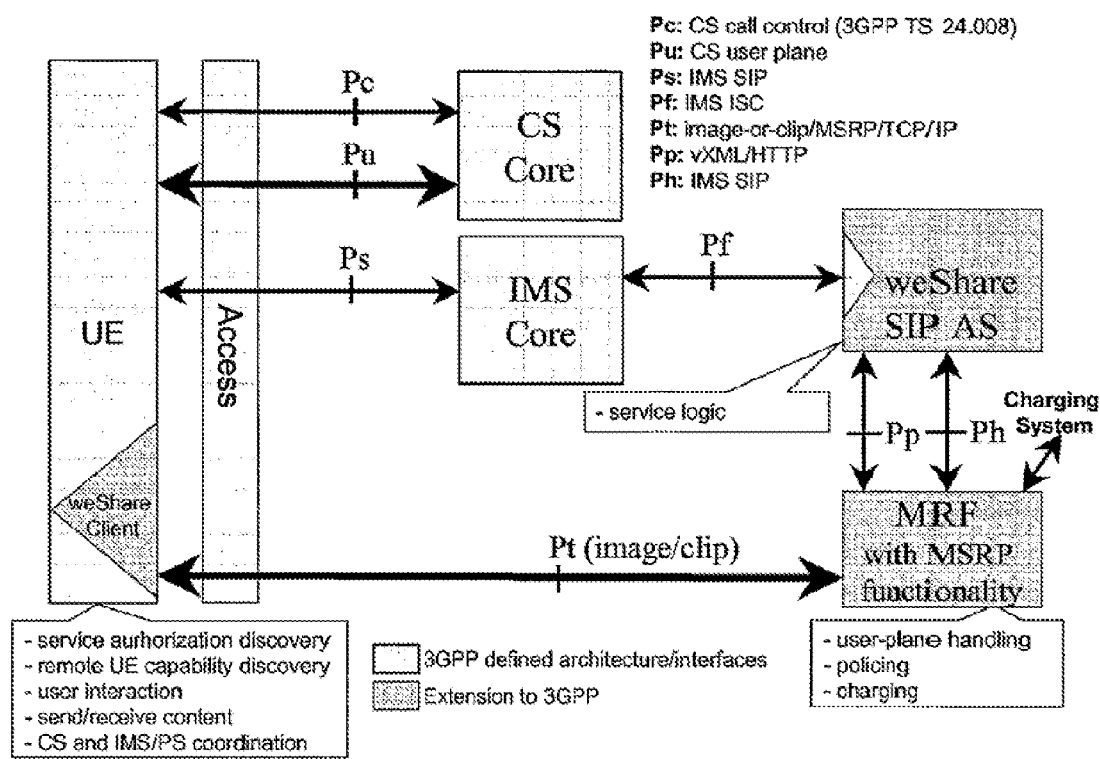
FIG. 3 illustrates schematically the weShare service architecture.

FIG. 3 illustrates the weShare service architecture including a functional split between the Session Initiation Protocol (SIP) Application Server (AS) providing service logic and policy control, and the Media Resource Function (MRF) with Message Session Relay Protocol (MSRP) functionality responsible for user-plane handling, policy enforcement and charging reporting. This architecture is based on the IMS as defined in 3 GPP R5/R6, 23.228 and 24.229, with the addition of a WeShare client and WeShare server functional entities. The User Equipment (UE) is the terminal equipment containing the weShare XX client or application software (where "XX" designates the weShare service, e.g. image, clip, etc). Every weShare XX service will use a Type A terminal [3 GPP TS 23.060].

The IMS core includes the Proxy-, Interrogating- and Serving-Call Session Control Functions (P-, I-, and S-CSCF respectively) and the Home Subscriber Server (HSS), as defined in 3 GPP R5/R6 TS 23.228 and TS 24.229. The IMS Core performs the following functions:

Routes the SIP signalling between the UE and the WeShare server;
Terminates the SIP compression from the terminal;
Performs IMS authentication and authorisation;
Maintains the registration state and the SIP session state; and
Reports to the charging system.

The UE shall send all SIP messages to the IP address of the P-CSCF (outbound proxy) after resolving the SIP URI of the P-CSCF to an IP address.

The SIP AS executes service logic. The MRF with MSRP functionality is responsible for user-plane handling, policy enforcement, and charging reporting. The Circuit Switched (CS) Core contains MSC/VLR, GMSC, HLR and possibly other logical elements according to 3 GPP R5/R6 TS 23.002.

The transfer of images and video-clips during a CS call can be done as part of a message session. This message session would be set up at the moment in the CS call where one of the users has expressed willingness to transfer an image. The transfer of images during a CS call can be handled by adapting a message session to carry these images.

Figure 4A:
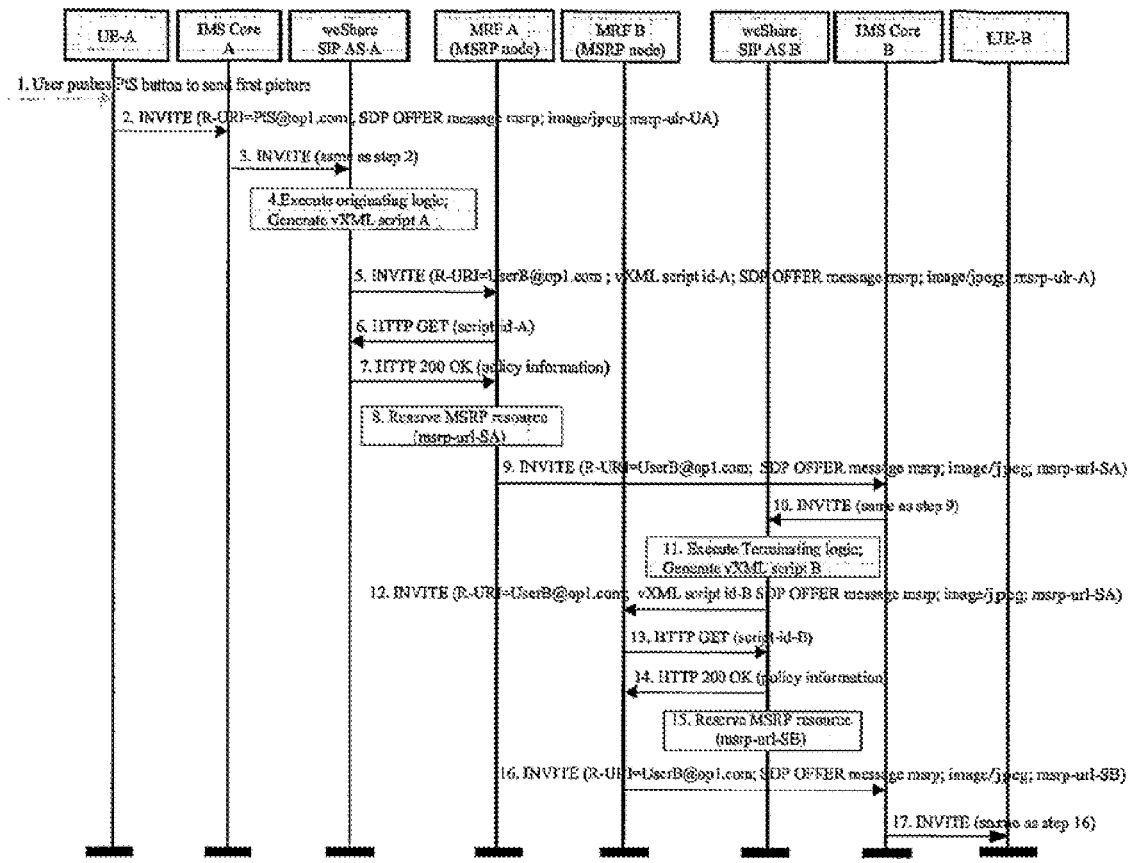
FIGS. 4a to 4c illustrate signaling exchanged between user terminals in connection with a weShare service.
Figure 4B:
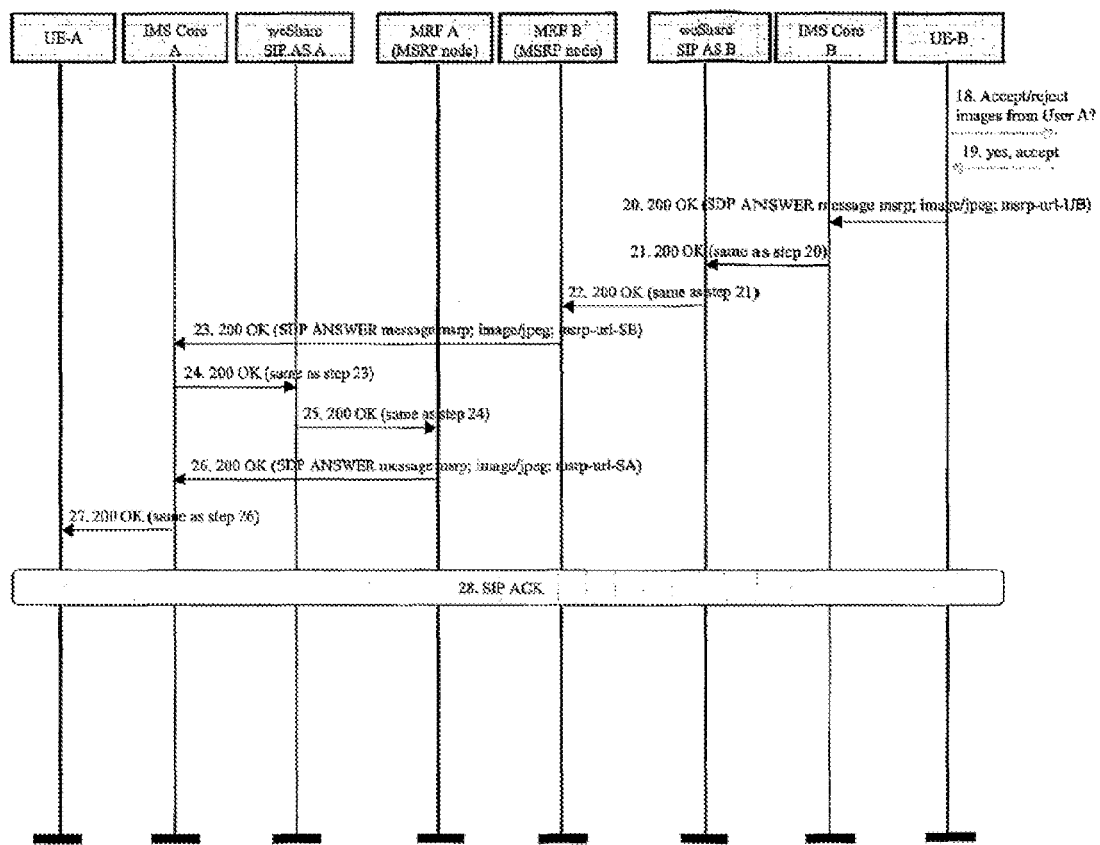
Figure 4C:
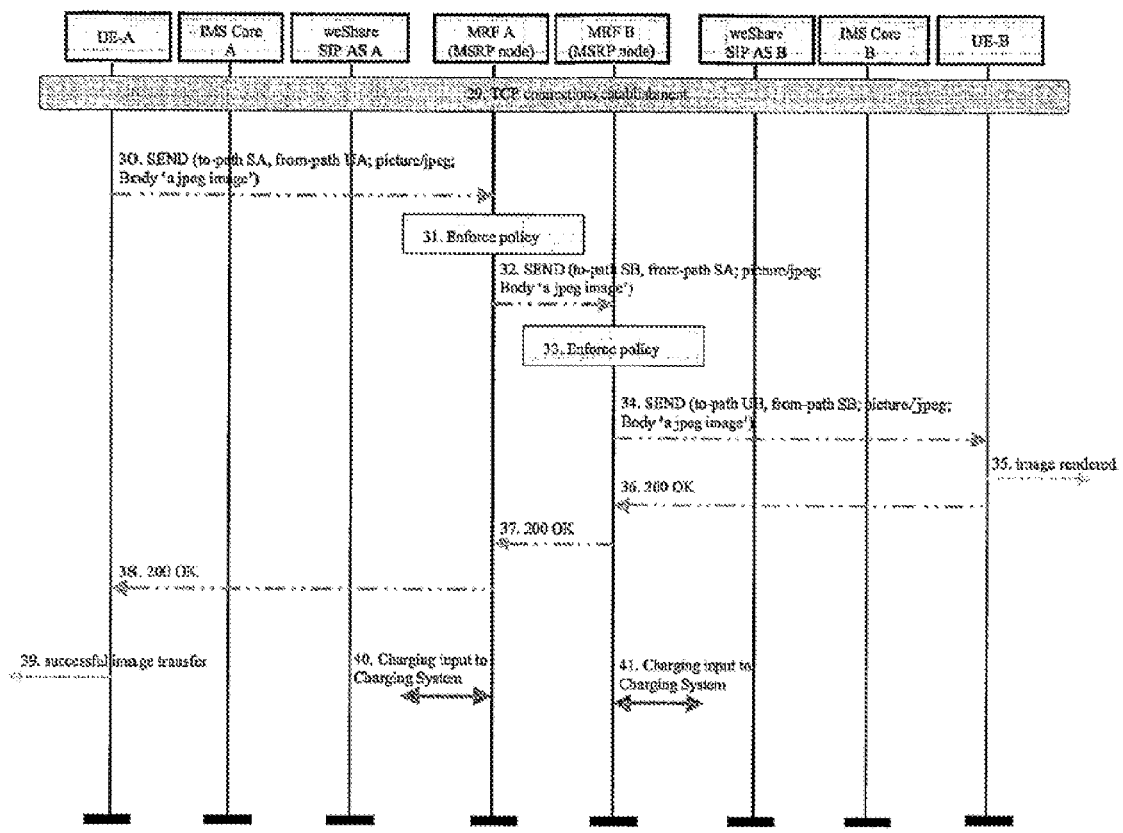

FIGS. 4a to 4c illustrates signaling exchanged between two user terminals (UE-A and UE-B) and network nodes, associated with a WeShare Image service. An assumption is that a CS call between the users has already been established. The signaling can be broken down into two main phases, as follows.

Phase 1—WeShare Session Set-Up Phase (Signaling Steps 1 to 28 in FIG. 4a and 4b)

Step 1. User-A takes a picture and pushes the WeShare button to send the image to User-B. User-A, who has been given an indication of WeShare service availability by the system, shall be able to prepare the image (e.g. by pressing a button to take a photograph with an inbuilt camera) and transmit it to the other party by pressing a WeShare button. The transmitting party's terminal may generate a query, e.g. confirm image, after presenting the image to its user, requesting that the user presses once again the button to initiate transmission. User-A, who has been given an indication of WeShare service availability, may also be able to select pre-stored content in his/her terminal's memory and transmit this content to the other party in the conversation.

Step 2. A WeShare IMS session set-up request towards the B-party is initiated. A SIP INVITE is sent to the IMS Core A. The "Request-URI" (e.g. PtS@operator.com) of the SIP INVITE contains the weShare service identity, while the identity of the invited user B shall be included in a body of the message. The SIP INVITE contains an SDP Offer which includes the supported/preferred media content-type (e.g. image/jpeg) and an MSRP URL (msrp-url-A) indicating where the UE-A is willing to receive MSRP requests. Step 3. The IMS Core A detects an originating trigger and forwards the request to the weShare SIP, AS A.

Steps 4. & 5. SIP AS A verifies that user A is authorized to use the weShare service feature (e.g. weShare Image). SIP AS A selects an MRF with MSRP capabilities, generates a vXML script (VXML script A) with instructions for the MRF, and sends the SIP INVITE to MRF A. The SIP INVITE includes:
the invited user B in the Request-URI
HTTP URI including the vXML scrip-id-A
SDP Offer (message msrp-url-A)

Steps 6. & 7. The MRF A requests the vXML script from SIP AS A, using the script-id-A received in the SIP INVITE. The SIP AS A returns a vXML document including the policy to be enforced. Such policy may include allowed content type (e.g. image, clip, etc.), allowed content size, allowed direction (e.g. send/receive). A protocol such as HTRP may be used for getting such policy information.

Step 8. MRF A reserves MSRP resources and allocates an MSRP-URL (msrp-url-SA).

Step 9. The MRF A behaves as a SIP B2BUA, creates a new SIP dialog, and sends a SIP INVITE to IMS Core B. The SIP INVITE includes:
the invited user B in the Request-URI
SDP Offer (message msrp-url-SA)

Step 10. The IMS Core B detects a terminating trigger and forwards the request to the weShare SIP AS B.

Steps 11. & 12. The SIP AS B verifies user B is authorized to the weShare service feature (e.g. weShare Image). SIP AS B selects an MRF with MSRP capabilities, generates a VXML script (VXML script B) with instructions for the MRF, and sends the SIP INVITE to MRF B. The SIP INVITE includes:
the invited user B in the Request-URI
HTTP URI including the vXML scrip-id-B
SDP Offer (message msrp-url-SA)

Steps 13. & 14. The MRF B requests the vXML script from SIP AS B, using the script-id-B received in the SIP INVITE. The SIP AS B returns a vXML document including the policy to be enforced. Such policy may include, allowed content type (e.g. image, clip, etc.), allowed content size, allowed direction (e.g. send/receive). A protocol such as HTRP may be used for getting such policy information.

Step 15. MRF B reserve MSRP resources and allocates an MSRP-URL (msrp-url-SB).

Step 16. The MRF B behaves as SIP B2BUA, creates a new SIP dialog, and sends a SIP INVITE to IMS Core B. The SIP INVITE includes:
the invited user B in the Request-URI
SDP Offer (message msrp-url-SB)

Step 17. IMS Core B forwards the SIP INVITE to UE-B.
Step 18. Upon receiving a WeShare IMS session set-up request, the receiving UE will prompt the receiving user to accept or reject the enrichment of the CS call to a WeShare multimedia session (i.e. whether he/she would like to accept the content/image).

Steps 19. & 20. The receiving user B accepts the request. UE-B sends a SIP 200 OK response to IMS Core B. The response includes an SDP Answer to the SDP Offer received in the INVITE request containing the supported/preferred media content-type (e.g. image/jpeg) and an MSRP URL (msrp-url-B) indicating where the UE-B is willing to receive MSRP requests.

Steps 21. & 22. The SIP 200 OK is forwarded to MRF B, via SIP AS B.

Step 23. The MRF B sends to IMS Core A an SIP 200 OK including the "msrp-url-SB"

Step 24. & 25. The SIP 200 OK is forwarded to MRF A, via SIP AS A.

Step 26. The MRF A sends to IMS Core A an SIP 200 OK including the "msrp-url-SA"

Step 27. IMS Core A forwards the SIP 200 OK to UE A.

Step 18. A SIP ACK is sent for each SIP dialog.

Phase 2—Image Transfer Phase (Signaling Steps 29 to 41 in FIG. 4c)

Step 29. TCP connections are established between UE-A and MRF-A, MRF-A and MRF-B, MRF-B and UE-B.

Step 30. UE-A sends to MRF A an MSRP SEND, over the established TCP connection, including the image.

Steps 31. & 32. The MRF A, upon receiving the MSRP SEND, enforces the policy. MRF A behaves as an MSRP back-to-back end point and sends the MSRP SEND to MRF B.

Steps 33. & 34. The MRF B, upon receiving MSRP SEND, enforces the policy. MRF B behaves as an MSRP "back-to-back end point" and sends the MSRP SEND to UE B Step 35. UE-B displays the image to User-B.

Step 36. UE B sends to MRF B an MSRP 200 OK response for the MSRP SEND request.

Step 37. MRF B sends to MRF A an MSRP 200 OK response for the MSRP SEND request.

Step 38. MRF A sends to UE A an MSRP 200 OK response for the MSRP SEND request.

Step 39. User A is notified of successful image transfer to User B.

Step 40. & 41. Upon receipt of the MSRP 200 OK, each MRF produces charging input towards the charging system, for billing of the users. NOTE: in case the content (e.g. image) is segmented in multiple chunks, the MRF generates charging input only when receiving the MSRP 200 OK for the last chunk.

The present invention is applicable to applications other than combinational multimedia services such as weShare. Example of other IMS service features to which the invention may be applied are:

1) Session Based Messaging Group Call. This is an instant messaging conference between more than two users (Session-based Messaging One to Many). A user calls a shared group stored in the network (i.e. a user group that can be used by several users who are typically part of the group, and that is likely to be owned by a single user). This service feature uses MSRP as the user-plane protocol.
2) Push-to-Talk over Cellular (PoC) Instant Group Call. This is a "walky-talky" style 1-to-N call to a shared group. This service feature uses RTCP and RTP as the user plane protocols.

For these alternative service features, the SIP INVITE request carrying the IP multimedia service request is forwarded from the IMS Core serving the inviting user A to the SIP AS A hosting the service logic for the requested service and for the inviting user A. Upon receiving the SIP INVITE request, the SIP AS processes it by executing the relevant service logic. When the service request is refused (e.g. due to a screening feature), the SIP AS acts as SIP UA and reject the session attempts, without involving an MRF. When the SIP INVITE request is accepted, the service logic builds a vXML script or an XML document containing the group members that should be invited to the call. The SIP AS acts as a proxy server and transmits the SIP INVITE, including the HTTP URI to be used to retrieve the script/document, to the MRF. The MRF retrieves the script or document, process it, and initiates invitation of the group members to the instant messaging (1) or PoC session (2). The MRF generates N SIP INVITE related to N SIP dialogs, one for each of the invited users.

This logic/mechanism may be applied to both originating and terminating features.

It will be appreciated by the person of skill in the art that various modifications may be made to the above described embodiment without departing from the scope of the present invention. In one application, the MSRP protocol may be used to transfer weShare data between users without the need for intermediate MSRP enabled nodes.

The invention claimed is:

1. A method of transporting image or video information between end user terminals via a packet switched network, the method comprising:
    establishing a circuit switched connection between a plurality of end user terminals for carrying voice traffic;
    using the Message Session Relay Protocol (MSRP) to encapsulate image or video information transmitted between end user terminals via a packet switched network, where MSRP related traffic is routed between said end user terminals via one or more MSRP enabled nodes;
    installing service policies into the or at least one MSRP node from a session initiation protocol (SIP) application server (AS) located in the control-plane of an IP Multimedia Subsystem (IMS) network; and
    at the MSRP enabled node(s), checking multimedia service requests against the installed policies to control end user terminal access to certain packet based services.

2. A method according to claim 1, wherein the or each said MSRP enabled node is a Media Resource Function (MRF) node.

3. A method according to claim 1 and comprising installing service policies into the MSRP enabled node by generating a script or document at the SIP AS, in response to receipt of a SIP request to initiate a multimedia service from an end user, forwarding the SIP request from the SIP AS to the MSRP enabled node, sending a script identifier in the SIP request from the SIP AS to the MSRP enabled node, and at the MSRP enabled node retrieving the script from the SIP AS.

4. A method according to claim 3, wherein said script is a voice over eXtended Markup Language (vXML) script.

5. A method according to claim 3, wherein said document is an eXtended Markup Language (XML) document.

6. A method according to claim 3, wherein at the MSRP enabled node said script or document is retrieved from the SIP AS over a HyperText Transfer Protocol (HTTP) protocol-based interface.

7. A method according to claim 6, wherein said script or document identifier is a Universal Resource Identifier (URI).

8. A method according to claim 3, wherein said SIP request is a SIP INVITE message.

9. A system for transporting image or video information between end user terminals, the system comprising:
    a circuit switched network operable to carry circuit switched traffic between a plurality of end user terminals;
    a packet switched network operable to carry packet switched traffic between the plurality of end user terminals;
    a plurality of end user terminals, each operable to:
        establish a circuit switched connection with another end user terminal over the circuit switched network
        transmit voice traffic over the circuit switched connection;

encapsulate image or video information using the Message Session Relay Protocol (MSRP);

transmit the encapsulated image or video information to over the packet switched network via one or more MSRP-enabled nodes; and a session initiation protocol (SIP) application server (AS) operable to install service policies into the one or more MSRP nodes; and the one or more MSRP enabled nodes operable to:

route MSRP-related traffic between end user terminals; and check multimedia service requests against the installed policies to control end user terminal access to certain packet based services.

10. A system according to claim 9, wherein the one or more MSRP enabled nodes comprise Media Resource Function (MRF) nodes.

11. A system according to claim 9, wherein the SIP AS is operable to:

install service policies into the MSRP enabled nodes by generating a script or document at the SIP AS, in response to receipt of a SIP request to initiate a multimedia service from an end user terminal;

forward the SIP request to one or more MSRP enabled nodes;

send a script identifier in the SIP request to the MSRP enabled node; and retrieve the script from the SIP AS.

12. A system according to claim 11, wherein said script comprises a voice over eXtended Markup Language (vXML) script.

13. A system according to claim 11, wherein said document comprises an eXtended Markup Language (XML) document.

14. A system according to claim 11, wherein at the MSRP enabled node said script or document is retrieved from the SIP AS over a HyperText Transfer Protocol (HTTP) protocol-based interface.

15. A system according to claim 14, wherein said script or document identifier comprises a Universal Resource Identifier (URI).

16. A system according to claim 11, wherein said SIP request is a SIP INVITE message.

* * * * *

UNITED STATES PATENT AND TRADEMARK OFFICE
CERTIFICATE OF CORRECTION

| | | |
|---|---|---|
| PATENT NO. | : 7,953,068 B2 | Page 1 of 1 |
| APPLICATION NO. | : 10/572499 | |
| DATED | : May 31, 2011 | |
| INVENTOR(S) | : Bellora et al. | |

It is certified that error appears in the above-identified patent and that said Letters Patent is hereby corrected as shown below:

Title Page, Item (57), under "ABSTRACT", in Column 2, Line 6, delete "the. Message" and insert -- the Message --, therefor.

In Column 1, Line 46, delete "video-lips." and insert -- video-clips --, therefor.

In Column 1, Line 47, delete ""draft-ieff" and insert -- "draft-ietf --, therefor.

In Column 4, Line 17, delete "HTRP" and insert -- HTTP --, therefor.

In Column 4, Line 42, delete "HTRP" and insert -- HTTP --, therefor.

In Column 5, Line 6, delete "Step 18." and insert -- Step 28. --, therefor.

In Column 6, Line 65, in Claim 9, delete "network" and insert -- network; --, therefor.

Signed and Sealed this
Thirteenth Day of March, 2012

David J. Kappos
*Director of the United States Patent and Trademark Office*